W. B. Scaife,
Pipe Coupling,
N° 46,395. Patented Feb. 14, 1865.
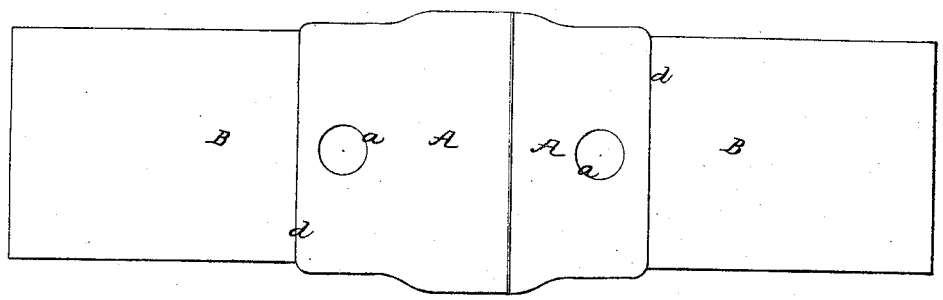
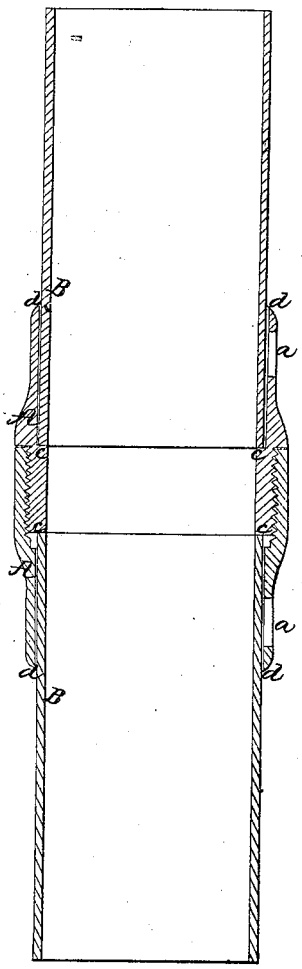
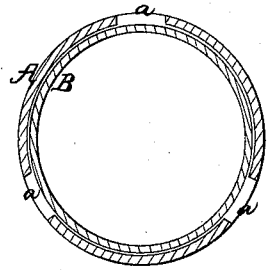
Witnesses.

UNITED STATES PATENT OFFICE.

WILLIAM B. SCAIFE, OF PITTSBURG, PENNSYLVANIA.

IMPROVEMENT IN BRAZING BRASS SCREWS TO IRON PIPES.

Specification forming part of Letters Patent No. 46,395, dated February 14, 1865.

*To all whom it may concern:*

Be it known that I, WILLIAM B. SCAIFE, of Pittsburg, in the county of Allegheny and State of Pennsylvania, have invented a new and useful Improvement in Uniting Brass Screws to Iron Pipe; and I do hereby declare that the following is a full, clear, and exact description of the same, reference being had to the accompanying drawings, forming part of this specification, in which—

Figure 1 is an external view of two pieces of iron pipe with brass male and female tubular screws applied to them. Fig. 2 is a longitudinal section of the same. Fig. 3 is a cross-section in the line $x\ x$ of Figs. 1 and 2.

Similar letters of reference in the several figures indicate corresponding parts.

In the operation or process of uniting tubular brass screws to iron pipe for the purpose of forming a coupling-joint it has been discovered that the brazing-solder used for that purpose cannot be made to run in from the end of the screw a sufficient distance to insure strength of union between the iron and brass. This is due to the fact that the entrance of the brazing-solder is prevented in a great degree by air confined under the screw or between the screw and the pipe, such air acting as a repelling force to the solder introduced at the end of the screw. It is furthermore due to the difficulty of introducing brazing-solder at the edge, there being no cup-like receiver to prevent an overflow or running down of the solder on the outside of the screw instead of between the screw and pipe.

My invention is designed to overcome the foregoing-stated difficulties, and the method by which I effect the same is the following:

In the circumference of the tubular screws A A holes $a\ a$ are cut, which reach through the brass cylinder to the iron pipe B B, upon which the screws are placed. These holes are at the point where the brass screws are united or brazed to the iron.

It will be observed that the end of the iron pipe abuts snugly against a shoulder, $c$, of the brass screw. This being so, the air which may be between the screw and the iron pipe cannot readily be expelled at that end of the pipe when the brazing-solder is introduced between the screw and the pipe. It will also be seen that no shoulder is formed at the end $d$ of the screw, and that, therefore, the confined air under the screw can readily pass off at this point, provided the brazing-solder is not introduced at that point.

To obviate the necessity of introducing the solder at the edge or end $d$, I provide the holes or cups $a\ a$, and introduce the solder into or by them under the screw. By having a number of holes, there is a greater certainty of passing the solder between every portion of the screw and pipe—that is, of those parts of the screw and pipe which are brazed or joined together.

When the solder passes under the screw it expels the air at the end $d$ of the screw, and therefore no formidable resistance is met with by it as it flows from the holes or cups.

The holes may be elliptical, rectangular, or any other form, and instead of holes open slots extending from the end of the screw a suitable distance toward the shoulder $c$ may be adopted, but such slots are not so good and effective as the holes or cups.

Screw coupling-joints of the description shown require great firmness and strength, and unless a perfect brazing of the brass to the iron can be effected the joint soon gives way. With my mode or process all difficulty as to strength of union between the metals is obviated.

I am aware that the two sections of pipe have been permanently connected together by means of cement or other material, such material being introduced through a hole or holes directly in the pipe or in a coupling band, but when pipe sections are thus united it is not with a view of having them disconnected and reconnected as is the case with my invention.

I disclaim the inventions or plans shown in the patents granted to James E. Quinn, April 26, 1859; Charles W. Isbell, July 24, 1860, and Robert Hale September 3, 1861.

What I claim as my invention, and desire to secure by Letters Patent, is—

As an article of manufacture, a tubular coupling in two sections, constructed so as to be screwed together, each section being provided with holes or apertures through which melted solder or other material may be poured, in order to cement or permanently attach said sections to the pipes, respectively, which are to be coupled together.

W. B. SCAIFE.

Witnesses:
THOMPSON BELL,
D. M. STEWART.